United States Patent [19]

Meyer

[11] Patent Number: 4,474,203
[45] Date of Patent: Oct. 2, 1984

[54] VALVE WITH PRESSURE ENERGIZED BACK SEAT SEALING MEANS

[75] Inventor: Danny S. Meyer, Richmond, Tex.

[73] Assignee: ACF Industries, Incorporated, New York, N.Y.

[21] Appl. No.: 528,836

[22] Filed: Sep. 2, 1983

[51] Int. Cl.³ .............................................. F16K 17/38
[52] U.S. Cl. .................................... 137/72; 137/315; 251/214; 277/27
[58] Field of Search .................. 277/9, 213, 212, 215, 277/27, 58, 59, 62; 251/214; 137/517, 72, 74, 75, 73, 77, 315

[56] References Cited

U.S. PATENT DOCUMENTS

| | | | |
|---|---|---|---|
| 2,647,721 | 8/1953 | Volpin | 137/72 |
| 3,064,674 | 11/1962 | Carfagna | 137/315 |
| 4,082,105 | 4/1978 | Allen | 251/214 X |
| 4,149,558 | 4/1979 | McGee et al. | 137/315 |
| 4,245,661 | 1/1981 | McGee | 137/72 |
| 4,271,857 | 6/1981 | Rowe | 137/73 |
| 4,379,557 | 4/1983 | Saka | 137/72 X |
| 4,421,134 | 12/1983 | Bruton et al. | 137/77 X |

Primary Examiner—Martin P. Schwadron
Assistant Examiner—John S. Starsiak, Jr.
Attorney, Agent, or Firm—Marvin J. Marnock

[57] ABSTRACT

A valve having a back-sealing capability provided by a pressure energizable sealing assembly which becomes operative independently of valve stem movement and valve element position for sealing between the valve casing (10, 22) and the valve stem (21) in the event of loss of sealing by the valve stem packing (33). A sealing ring (45) of the sealing assembly is installed with limited axial movement in an enlargement (20a) of the valve stem bore located intermediate the valve stem packing (33) and the valve chamber (11). The sealing ring (45) is provided with inner peripheral sealing surfaces (54) and an outer peripheral sealing surface (51) conforming in configuration to that of a corresponding sealing surface (42) provided in the stem bore enlargement. Yieldable spacer means (47) are provided for normally maintaining the sealing ring with the outer peripheral sealing surface (45) of the sealing ring in close proximity to the sealing surface (42) of the valve stem bore enlargement whereby the sealing assembly is responsive to a pressure differential induced across the sealing ring by a stem packing leak to establish a pressure energized metal-to-metal seal between the valve casing and the valve stem. In a modified form, the yieldable spacer means includes a eutectic member (62) which melts at a predetermined temperature whereby the magnitude of the packing leak at which the sealing assembly becomes operative is minimized.

7 Claims, 3 Drawing Figures

4,474,203

VALVE WITH PRESSURE ENERGIZED BACK SEAT SEALING MEANS

BACKGROUND OF THE INVENTION

The invention relates generally to valves and more particularly to valves having back seat arrangements as a secondary sealing means.

It is well known to provide a valve operator with a back seat capability whereby under predetermined conditions a fluid-tight seal may be established between cooperative seating surfaces on the interior of the valve casing and the valve stem. The back seat capability is desirable as a secondary sealing means which can be placed in operation in the event of a loss of sealing normally provided by the valve stem packing. This capability is also useful when it is desired to replace or repair a valve stem packing. For example, U.S. Pat. No. 855,385 teaches the concept of back seating of a rising stem plug valve wherein raising of the valve element to the full open position by means of a handwheel accomplishes a metal-to-metal seal between the interior of the valve casing and the valve spindle. The back seating is intended for use when it is desired to replace the valve stem packing gland without removing the valve from service and shutting off the flowline.

In U.S. Pat. No. 4,245,661 a valve is disclosed wherein the normally non-rising stem operator and its bearing enclosing bonnet gland can be manually raised so that the stem packing can be removed and replaced without disturbing the valve installation. The patent also discloses the use of a eutectic material which is subject to melting at a predetermined high temperature whereby the valve stem will automatically rise and establish a back seat to preclude a possibility of leakage due to a stem packing failure. As is true with most examples of valves with back seating capability provided by use of a eutectic material, the automatic back seating of the valve stem requires the condition of an extremely high temperature such as occurs with a fire. It is also a characteristic of manually operated valves that back seating becomes operative only when the valve is in either the fully closed or fully open condition, but not both. Further, since the back seat is connected to the stem in the prior art devices, whether the valves are operated by handwheels or actuators, it does not become operative should the valve stem become locked in place as in the event of a malfunction to a pneumatic or hydraulic valve actuator or a handwheel drive mechanism. However, in no instance does back seating occur directly as the result of loss of integrity of the valve stem packing.

It is therefore a purpose of this invention to provide a back seat capability for valves which is independent of valve stem movement or valve element position for accomplishing a fluid-tight seal between a valve casing and the valve stem in the event of leakage around the stem packing and which is adapted for use with either rising stem or non-rising stem valves.

It is another object to provide a pressure energizable back seat means for valves which is unconnected with the valve stem and is operative independently of the valve stem position for quickly accomplishing a seal between the valve casing and the valve stem in the event the valve is exposed to an extremely high temperature condition and there is a failure of the stem packing.

SUMMARY OF THE INVENTION

The invention relates to a valve of the type having a valve casing, a valve element, a valve stem and a stem packing. The valve has a back seating capability provided by a pressure energizable sealing assembly which becomes operative independently of the valve stem movement and valve element position for accomplishing a fluid-tight seal between the valve casing and the valve stem in the event of stem packing failure. The sealing assembly is installed at a location between the valve casing and the valve stem packing in an enlarged counter bore opening to the valve chamber, and being partly defined by an annular sealing surface. The assembly comprises a retainer ring which is fixed in position in abutting engagement with the shoulder provided by the counter bore and a metal sealing ring having an inner peripheral sealing surface and a circumferential sealing surface about its external periphery of a configuration conforming to that of the sealing surface of the counterbore. The sealing ring is attached to the retaining ring within the counterbore in coaxial relation to the valve stem bore and with limited axial movement relative to the retaining ring. A yieldable spacer member is interposed between the retaining ring and the sealing ring for maintaining the sealing ring at a fixed distance from the retaining ring with the sealing surface of the sealing ring in close proximity to the sealing surface of the counterbore. In the event of a failure of the valve stem packing, the sealing assembly is adapted to respond to a pressure differential induced across the sealing ring which exceeds the yield strength of the spacer member to thereby cause a back seating of the sealing ring with the sealing surface of the counterbore. A fluid-tight pressure energized metal-to-metal seal is therefore established between the valve casing and the valve stem by engagement of the inner and outer peripheral surfaces of the sealing ring with the valve stem and the counterbore sealing surface, respectively.

DESCRIPTION OF A PREFERRED EMBODIMENT

Figure 1:
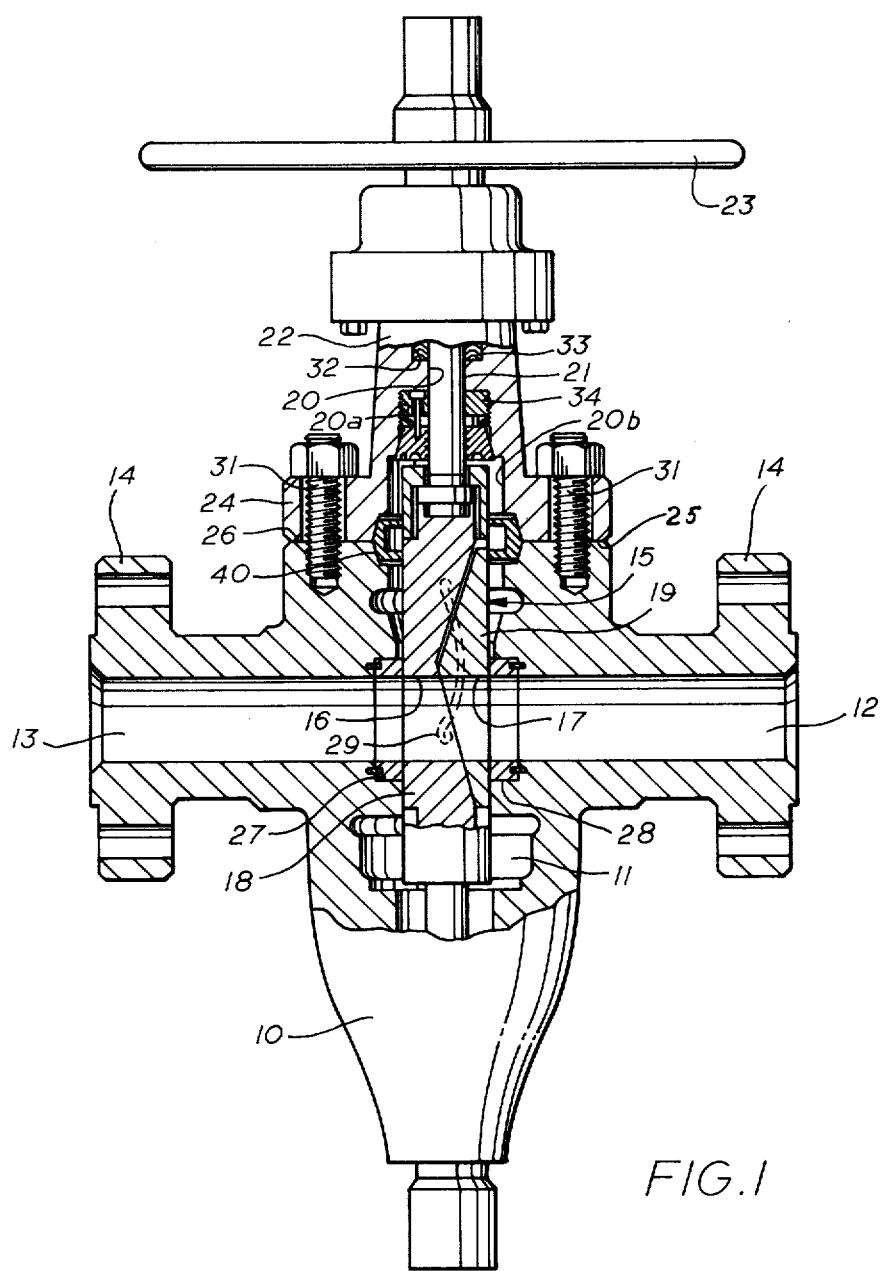
FIG. 1 is a vertical sectional view of a valve which incorporates a secondary back seat sealing assembly in accordance with a preferred embodiment of the invention.

Referring to the drawings in greater detail, the invention is illustrated herein in connection with a gate valve which utilizes the principle of parallel expanding gates for obtaining a positive mechanical seal on the upstream and downstream sides of the gate assembly. The valve in FIG. 1 which illustrates a typical application of the back seating secondary sealing means of this invention includes a valve body 10 with a valve chamber 11 and inlet and outlet flow passages 12 and 13 which are in fluid communication with the valve chamber 11 to form a flow way through the valve. Flanges 14 at the ends of the valve body provide means for connecting the valve in a flowline.

Within the valve chamber 11 a gate assembly 15 is mounted for sliding movement transversely of the flow passages to open or close the flow way. The gate assembly 15 comprises a gate member 18 and a segment 19. The gate member 18 is connected at its upper end to a valve stem 21 which extends through the valve bonnet 22 which is bolted atop the valve body 10 and closes the upper end of the valve chamber 11. At its upper end the stem 21 is provided with a valve actuating handwheel 23. The valve shown is of the rising stem type and the stem 21 is connected to the gate member 18 so that upon rotation of the handwheel and the stem, the gate assembly is prevented from rotation but is movable across the flow way to open or close the valve. In the valve open position, ports 16, 17 in the gate and segment members, respectively, are aligned in registry with the inlet and outlet passages 12 and 13.

As shown in FIG. 1, the bonnet 22 is secured to the valve body by studs 31 which pass through a radial flange 24 on the lower end of the bonnet with the flat end surface 25 of the bonnet superimposed against the flat annular surface 26 of the valve body 10. It is also seen that a metal sealing ring 40 is installed at the joint between the bonnet 22 and the valve body 10 to effect a fluid-tight seal under all pressure conditions. Preferably, the sealing ring 40 is a pressure energized seal of the type disclosed in copending U.S. patent application Ser. No. 448,143, filed Dec. 9, 1982, now U.S. Pat. No. 4,408,771.

As is typical of expansible gate assemblies, the gate member 18 is provided with a V-shaped recess which accommodates the wedge shaped segment 19, the wedge faces of which conform to the surfaces of the V-shaped recess and are in contact therewith. Also, characteristically, the linear movement of the gate assembly to open or close the valve causes an expansion of the gate assembly in both its open and closed positions due to relative sliding movement between the gate and segment members 18 and 19 as induced by suitable stops (not shown) in the valve chamber 11 for limiting the vertical movement of the segment 19 relative to the gate 18. When in expanded condition, the gate assembly seals against seat rings 27 and 28 mounted in annular recesses which surround the flow passages 12 and 13 and open to the valve chamber 11. The gate assembly 15 is also provided with a biasing means such as a pair of bow springs 29 which are fixed to the sides of the gate assembly and bias the gate assembly towards a collapsed condition wherein the segment member 19 is nested in the V-shaped recess of the gate member 18. Accordingly, when in transit between the open and closed positions the gate assembly 15 is in collapsed contracted condition and the valve chamber 11 is exposed to the flowline pressure.

It is also to be seen that the central bore 20 which extends through the bonnet 22 is enlarged adjacent the end thereof nearest the handwheel to provide a packing chamber 32 for receiving a stem packing 33. The central bore 20 also includes an enlarged diameter portion 20b thereof at the lower end of the bonnet so as to form an extension of the valve chamber 11 for accommodating the gate assembly 15. Intermediate the packing chamber 32 and the bore portion 20b, the central bore 20 is also provided with a bore portion 20a of relatively enlarged diameter but slightly smaller than the diameter of bore portion 20b to which it adjoins. Mounted within the bore 20a is the back seating secondary sealing means of the invention.

Figure 2:
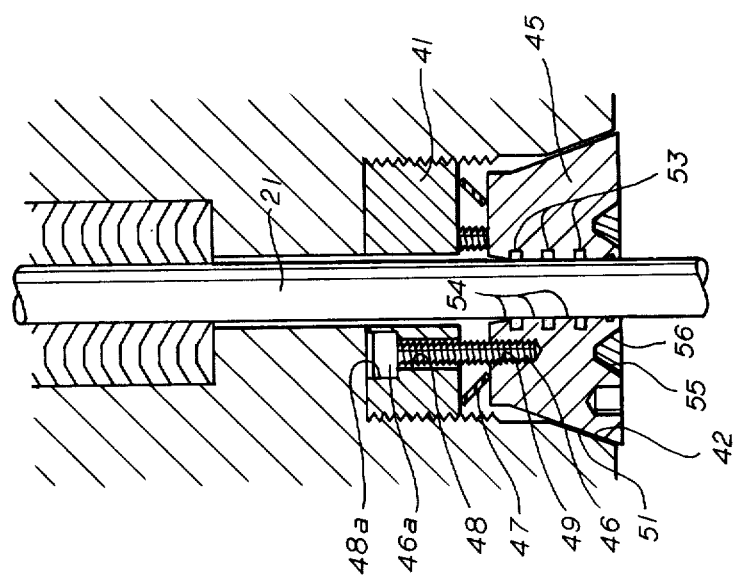
FIG. 2 is an enlarged detailed sectional view of the back seat sealing assembly incorporated in the valve of FIG. 1.

As shown in greater detail in FIG. 2, the secondary sealing means of the invention includes a pressure energizable back-seating assembly which is adapted to provide a secondary metal-to-metal seal between the interior of the valve casing and the valve stem 21 in the event of a failure of the valve stem packing 33. The backing-seating sealing assembly comprises an annular metal retainer 41 which is disposed in surrounding relation to the valve stem and threadably received in the enlarged counterbore 20a of the valve stem bore 20 to abut the radial annular shoulder 34 formed by the counterbore. Adjacent its open end, the counterbore 20a is defined by a frusto-conical sealing surface 42 diverging outwardly to open into the valve chamber 11. The secondary sealing means further comprises a lower metallic sealing ring 45 which is also disposed in surrounding relation to the valve stem and coaxial therewith. The lower sealing ring 45 is attached to the retainer ring 41 by a plurality of screws 46 but is axially spaced from the retainer ring by a Belleville spring 47 which also encircles the valve stem. Each screw 46 is slidably positioned to extend through a smooth bore 48 provided through the retainer ring with the enlarged head 46a of the screw received in an enlarged diameter portion 48a of the smooth bore 48 and the lower end of each screw 46 being threaded into an internally threaded blind bore 49 in the sealing ring 45. The head 46a of the screw is designed with a smaller axial dimension than the depth of the enlarged bore portion 48a so that a gap exists between the top of the screw and the shoulder 34.

The external periphery of the sealing ring is formed with a frusto-conical sealing surface 51 with a taper conforming to that of the frusto-conical surface 42 of the enlargement 20a of the valve stem bore so as to be adapted for cooperative sealing engagement therewith. The inner periphery of the sealing ring 45 is in the form of a circular cylindrical surface with a plurality of annular grooves 53 formed in axially spaced relation to one another to define annular sealing surfaces 54 which are adapted to sealingly engage the cylindrical surface of the valve stem. The lower annular end surface of the sealing ring 45 is provided with a coaxial annular groove 55 which opens widely at the end surface of the sealing ring closely adjacent the central opening through the ring to provide a flexible lip 56 which is also adapted for sealing engagement with the valve stem. In operation of the valve, the back-seating secondary seal assembly of this invention is manually inoperative even though the valve chamber 11 may be highly pressurized. However, should there be a failure of the valve stem packing with resultant leakage, a pressure differential would exist across the sealing ring 45 so that the sealing ring 45 is urged in the direction outwardly of the valve chamber 11 and towards the retainer ring 41. When the pressure differential exceeds a predetermined amount, the frusto-conical sealing surface 51 of the sealing ring 45 is moved into metal-to-metal sealing engagement with the frusto-conical sealing surface 42 of the bonnet. In addition, the sealing ring 45 is pressure energized to establish metal-to-metal sealing contact with the valve stem 21 by means of the lip seal 56 and the annular sealing surfaces 54. While the leakage is then eliminated, the sealing ring 45 remains in a pressure energized sealing condition since a pressure differential will still exist across the sealing ring 45. It is then possible to repair or replace the valve stem packing without removing the valve from its connection in a flowline.

Obviously, it is the strength of the Belleville spring 47 which determines when the leak and accompanying pressure differential is of sufficient magnitude to cause the sealing ring 45 to move into sealing engagement with the valve stem and the frusto-conical surface of the valve stem bore. Accordingly, the selection of a Belleville spring is largely controlled by the intended application of the valve and the criticality of leakage. A very low strength spring would be appropriate when it is desired that very small leaks be quickly aborted.

Figure 3:
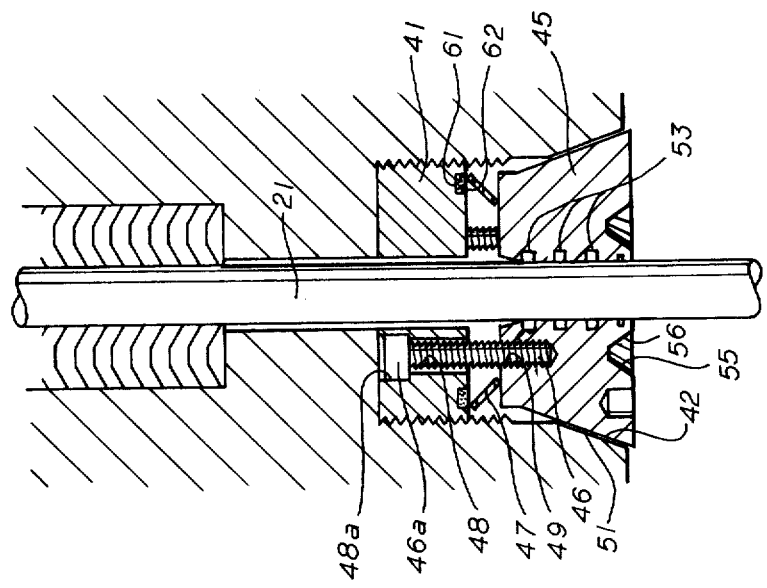
FIG. 3 is an enlarged detailed sectional view of a modified form of the back seat sealing assembly which may be used in the valve of FIG. 1.

A modified form of the sealing assembly of this invention is shown in FIG. 3. For ease of description the component parts of this modification, which are identical to those in the embodiment illustrated in FIG. 2, are provided with the same reference numbers. The sealing assembly in FIG. 3 is adapted to eliminate the function of the Belleville spring should the valve be exposed to very high temperature conditions such as in a fire in order that the sealing assembly can respond more quickly if the stem packing begins to leak. It is particularly suitable for applications of the valve wherein the leakage of flammable fluids is to be particularly avoided.

As seen in FIG. 3, the retainer ring 41 is provided with an annular groove 61 in its flat annular bottom surface for accommodating an annular insert 62 of a eutectic material which is selected to yield at a particular temperature such as 302° F., which is the yield temperature of "Cerrocast" a material sold by Cerro Copper and Brass Company of Bellefonte, Pa. Various other eutectic materials, such as alloys of tin and bismuth or antimony might also be employed. The eutectic material is inserted in the groove 61 which is located adjacent the outer periphery of the retainer ring such that the top annular edge of the Belleville spring 47 is in abutting engagement with the eutectic ring insert 62 throughout its extent. By means of the screws 46 being located inside the circular opening of the Belleville spring, the Belleville spring is fixed in position. Should the valve be exposed to a fire, for example, the eutectic insert will melt at its characteristic yield temperature and the top edge of the Belleville spring will be permitted entry into the annular groove 61 in the bottom of the retainer ring. Accordingly, at this yield temperature, the Belleville spring will no longer function to retain the sealing ring 45 at a fixed, spaced distance from the retainer ring 41 and therefore the pressure differential which must exist across the sealing ring 45 in order to render it operative may be extremely small. The sealing assembly is therefore adapted to respond very quickly if a leak develops in the stem packing and even though the leakage is very small.

It will therefore be seen that a unique back seating sealing arrangement for valves is herein provided which is adapted to become operative in the event of a valve stem packing failure. It operates only when there is a packing leak and its operation is independent of valve stem position. Also, it is not subject to a restriction that the valve need be in the open or closed condition. It is suitable for use with a wide variety of valves such as with slab gate or expanding gate valves and rising stem or non-rising stem valves whether equipped with handwheels or automatic actuators. It could also be employed with ball valves.

It is also to be understood that the foregoing description of a preferred embodiment of the invention has been presented for purposes of illustration and description and is not intended to limit the invention to the precise form disclosed. For example, a stack of Belleville springs or coiled spring or other spring device might be used in lieu of the Belleville spring which is disclosed herein for maintaining the sealing ring in a specific spaced relation from the retainer ring. Also, the conforming sealing surfaces of the valve casing and the sealing ring need not be restricted to the frusto-conical configuration, although such is preferred. It is to be appreciated, therefore, that changes in details of the illustrated construction may be made by those skilled in the art, within the scope of the appended claims, without departing from the spirit of the invention.

What is claimed is:

1. A valve structure having a valve casing with a valve chamber therein and inlet and outlet flow passages communicating with the valve chamber and defining a flow way through the valve casing, a valve element mounted in the valve chamber for movement between open and closed positions relative to said flow passages, a valve stem connected to the valve element and extending through a valve stem bore provided through the valve casing, whereby it is adapted for connection to a valve operator, a valve stem packing mounted in said bore for establishing a fluid-tight seal between the valve casing and the valve stem, said bore having an enlarged diameter counterbore portion intermediate the packing and the valve chamber and being partly defined by a sealing surface section;

a secondary sealing assembly received in said enlarged diameter bore portion, said secondary sealing assembly comprising a retainer member fixedly mounted in said enlarged bore portion in coaxial relation to said valve stem;

a sealing ring having a circumferential sealing surface about its external peripheral with a configuration conforming to that of the sealing surface section of said enlarged diameter bore portion, and an inner peripheral sealing surface means;

means attaching said sealing ring in coaxial relation with said valve stem with limited axial movement relative to said retainer member; and yieldable spacer means for maintaining said sealing ring at a fixed axial distance from said retainer member with the external sealing surface of said sealing ring in close proximity to the sealing surface section of said enlarged bore portion whereby the sealing ring of said secondary sealing assembly is responsive to a pressure differential induced across said sealing ring by leakage of said packing which exceeds the yield strength of said spacer means to establish a fluid-tight metal-to-metal seal between the valve casing and the valve stem.

2. A valve structure as described in claim 1 wherein said yieldable spacer means is a Belleville spring mounted between said retaining member and said sealing ring.

3. A valve structure as described in claim 1 wherein said sealing surface section of the enlarged bore portion is of frusto-conical configuration.

4. A valve structure as recited in claim 1 wherein said retainer member is a ring encompassing said valve stem and said enlarged diameter bore portion includes an internally threaded section intermediate said sealing surface section and said packing with the retainer ring being threadedly received in said internally threaded bore section.

5. A valve structure as recited in claim 1 wherein said means attaching said sealing ring to the retainer member comprises a plurality of screws having threaded end portions which are threaded into accommodating threaded bore in the sealing ring and upper shank portions slidably received in accommodating smooth bores formed in the retainer member with the screw heads spaced from the annular radial shoulder defined by the counterbore.

6. A valve structure as recited in claim 2 wherein a ring of eutectic material is affixed to the side of the retainer ring facing said sealing ring in surrounding relation to the valve stem and the annular edge of the Belleville spring is disposed throughout its circumference in abutting engagement with the ring of eutectic material whereby said eutectic ring is adapted to melt at a predetermined temperature and thereby minimize the magnitude of a stem packing leak and associated pressure differential across the sealing ring at which said sealing assembly is responsive.

7. A valve structure as recited in claim 1 wherein the sealing ring is provided with a plurality of annular grooves in its inner periphery to provide a plurality of narrow annular sealing surfaces and an annular flexible lip at the side of the sealing ring exposed to the valve chamber and defining an annular sealing surface adapted for sealing engagement with the valve stem.

* * * * *